United States Patent
Nikhra et al.

(10) Patent No.: US 9,618,910 B2
(45) Date of Patent: Apr. 11, 2017

(54) ON-DEMAND DEVICE TEMPLATES FOR INTEGRATING DEVICES IN A PROCESSING FACILITY

(71) Applicant: HONEYWELL INTERNATIONAL INC., Morristown, NJ (US)

(72) Inventors: Abhishek Nikhra, Karnataka (IN); Joseph Felix, Lansdale, PA (US); Suraj Prakash, Karnataka (IN); Ashutosh Singh, Chhattisgarh (IN); Girish Krishnanivas, New Delhi (IN)

(73) Assignee: Honeywell International Inc., Morristown, NJ (US)

( * ) Notice: Subject to any disclaimer, the term of this patent is extended or adjusted under 35 U.S.C. 154(b) by 669 days.

(21) Appl. No.: 14/074,071

(22) Filed: Nov. 7, 2013

(65) Prior Publication Data

US 2014/0371882 A1 Dec. 18, 2014

Related U.S. Application Data (60) Provisional application No. 61/835,142, filed on Jun. 14, 2013.

(51) Int. Cl.
*G06F 19/00* (2011.01)
*G05B 13/02* (2006.01)
*G05B 19/042* (2006.01)

(52) U.S. Cl.
CPC .......... *G05B 13/02* (2013.01); *G05B 19/0423* (2013.01)

(58) Field of Classification Search
CPC .................... G05B 13/02; G05B 19/0423
See application file for complete search history.

(56) References Cited

U.S. PATENT DOCUMENTS

| 5,960,214 A | 9/1999 | Sharpe, Jr. et al. |
| 7,251,534 B2* | 7/2007 | Walls .................. G05B 19/042 340/517 |
| 2004/0059851 A1* | 3/2004 | Donaires ............ G05B 19/0423 710/104 |

(Continued)

FOREIGN PATENT DOCUMENTS

| SU | 1300256 | 3/1987 |
| WO | 9504314 | 2/1995 |

OTHER PUBLICATIONS

Ko, Minsuk, and Sang C. Park. "Template-based modeling methodology of a virtual plant for virtual commissioning." Concurrent Engineering 22.3 (2014): 197-205.*

(Continued)

*Primary Examiner* — Michael D Masinick
(74) *Attorney, Agent, or Firm* — Jetter & Associates, P.A.

(57) ABSTRACT

A method (100) of generating on-demand device templates for integrating a controller controllable (CC) device with a process controller in a processing plant. A device description for the CC device is obtained (101) including a list of device parameters, connection details for communications including assembly structures, and a mapping of the device parameters into the assembly structures or the device description. Using a device template generating algorithm a custom device template is generated (102) for the CC device (i) by modifying an existing device template to include at least one modification or (ii) from the device description.

14 Claims, 4 Drawing Sheets

(56) References Cited

U.S. PATENT DOCUMENTS

| | | | |
|---|---|---|---|
| 2007/0075916 A1* | 4/2007 | Bump | G05B 19/41845 345/3.1 |
| 2007/0077665 A1 | 4/2007 | Bump et al. | |
| 2007/0100471 A1* | 5/2007 | Kumar | G05B 19/0426 700/18 |
| 2009/0156251 A1* | 6/2009 | Cannistraro | G08C 17/02 455/557 |
| 2010/0138778 A1* | 6/2010 | Dewan | G06F 9/4443 715/789 |

OTHER PUBLICATIONS

Honeywell Experion LX Dictionary, EXDOC-XX29-en-110A, R110, Feb. 2014, specifically p. 55, Honeywell Process Solutions.

* cited by examiner

ON-DEMAND DEVICE TEMPLATES FOR INTEGRATING DEVICES IN A PROCESSING FACILITY

CROSS REFERENCE TO RELATED APPLICATIONS

This application claims the benefit of Provisional Application Ser. No. 61/835,142 entitled "CUSTOMIZED DEVICE TEMPLATES FOR INTEGRATING DEVICES IN A PROCESSING PLANT", filed Jun. 14, 2013, which is herein incorporated by reference in its entirety.

FIELD

Disclosed embodiments relate to device templates for integrating devices in a processing plant.

BACKGROUND

A control system in a processing facility that processes tangible products (e.g., a manufacturing plant or refinery) includes at least one process controller which integrates (interfaces) with a wide variety of different controller controllable (CC) devices from a plurality of different third-party vendors that can be configured and controlled by the control system (e.g., input/output (I/O) modules and devices such as industrial drives and programmable electronic relays). Such CC devices connect the process controller to a variety of field devices comprising actuators and sensors in the processing facility. The actuators and sensors are not directly configured in the control system, except in the case of smart field devices.

Communications between the process controller and the CC devices is enabled by device templates which are stored at the process controller. Device templates include device description information (data) about the physical and logical blocks that make up the CC device used for the integration of the device with the process controller. Device templates also include other device description information about parameters of the CC device, the device's communication protocol, data format (e.g., serial data or parallel form), status and alarms.

Conventional device templates are pre-built (stored) in the engineering repository of the process controller so that the device description information in the device template is static (fixed) as process controller firmware. The device templates are generally specific (per) device and hence cannot be used for other devices even if they are of same type of device and used for same purpose. Device templates can also be created for a particular type/category of devices, such as for industrial drives. Device templates for an industrial drive can be used to integrate industrial drives into the process control system, but cannot be used for other CC devices such as programmable electronic relays.

The following are likely problems with a conventional plant integration scheme using known static device templates:

1. It is not practical to create static device templates for every CC device that may be used by the customer in the processing facility. In some cases a CC device may be introduced after the release of the process control system. In such a case the new CC device cannot be integrated without releasing a new version of the control system (with a firmware update).

2. Static device templates can only be used to integrate specific device types and cannot be extended to integrate other device types. Static device templates have following characteristics:

I. Addition of a new CC device requires a new development effort. Development work is required to support configuration, control and monitor of the new CC device.

II. Static device templates cannot be guaranteed to work after a firmware upgrade of a CC device as it may have become inconsistent with the new revision of device firmware. This limitation can force the customer to use a specific device firmware version; and this may not be practical if there are any critical patches in the newer revision of the firmware.

III. There is generally no way for the user to add any additional parameter(s) from a given CC device other than what is already available in the static device template. Parameters available from a given CC device depend on the type and make (manufacturer) of a particular device. For example, consider an industrial drive where the device template includes parameters for controlling the speed and customer's application and the customer would like to add additional parameters to also control the torque and position of the industrial drive. This can only be done by modifying the device template which requires a development effort and another release of the device template product.

IV. A failed CC device cannot be replaced with a new version of the same device as it cannot be guaranteed to work because the device template is dependent on the firmware associated with the device. New firmware for a CC device may not support the feature and data format used in the control system so that the device template cannot be guaranteed to work.

3. Static device templates based on standard device profiles do not allow use of the extended capability(ies) of the CC device. Device templates based on standard profiles provide an interface that contain features common to devices of the same category and do not expose extended capabilities of the device to enable their use. Static device templates do allow CC devices of a similar category to be integrated into the control system, but do not allow extended capability(ies) of the device to be used beyond the standard set of capabilities defined in the static device template. Using this least common denominator approach can dumb down an otherwise intelligent CC device in the control system.

4. The vendor supplied device description file (e.g., electronic data sheet (EDS) file) for common industrial protocol (CIP) or device description (DD) file for Foundation Fieldbus (FF) of the CC device may not have sufficient details to generate a device template; and in some cases such details may not even be available. For example, the CIP standard proposes use of the EDS file associated with the device to define its capabilities. This file is created by the device vendor and contains information about device identification including configuration parameters and connection details.

SUMMARY

This Summary is provided to introduce a brief selection of disclosed concepts in a simplified form that are further described below in the Detailed Description including the drawings provided. This Summary is not intended to limit the claimed subject matter's scope.

Through study of Ethernet/IP (EIP) communication protocol devices from different vendors the Inventors have found that vendor supplied device description files generally do not contain enough information to create a device template effective for enabling the sending to and receiving of information from the process controller to enable the process controller to control a controller controllable (CC) device. In most cases these files only contain information about the identification (type) of the CC device type (e.g., an industrial drive) and the connections that it supports.

Disclosed embodiments solve this problem by describing on-demand creation of device templates for integrating real (physical) CC devices with a process controller in a process control system that processes or produces tangible products (e.g., a manufacturing plant or refinery) for the purpose of process control. Disclosed device templates are derived from a device description for a given CC device which provides information about the physical and logical blocks that make up the device which provides the information needed by the process controller to communicate with the CC device and understand the format of the input and output data.

As used herein a CC device refers to real (physical) devices in a processing facility that can either directly send or receive information from a process controller, and thus can be configured and controlled by the process controller. Some CC devices may have capability to both send and receive information with the process controller. Information being communicated between the CC device and process controller may include data, command, or status information. Some example of CC devices include analog input, analog output, industrial drives, programmable electronic relays, and smart field devices including certain thermocouples.

Disclosed device templates include device description information generally including a list of device parameters, the data format, status and alarms, and connection details including its communication protocol, as well as assembly structures and a mapping of the device parameters into the assembly structures. Disclosed device templates are not firmware based as are conventional device templates, and there is nothing predefined in the system about the CC device or device type. The device description information can come from electronic description file supplied by the device vendor or by manual entry by the user. Disclosed device templates are thus generated on-demand as needed based on the device description which provides all the information needed by the process controller to communicate with the CC device and understand the format of input and output data.

A user can also customize the device template depending upon the need and processing facility (e.g., plant) application. For example an industrial drive template that is providing information about speed can be customized to provide position and torque information of the motor as well. Customization of the device template can be performed while creating the device template (see FIGS. 2A and 2B described below), or after the device template has been created by modifying an existing device template (see FIG. 2C described below).

Disclosed customized device templates thus allow communications (read and/or write) between the process controller and any particular CC device in a processing plant, without the need for any new programming. Disclosed device templates may be contrasted with conventional static (fixed) device templates realized in firmware which as described above have a variety of limitations, including the need for product development including new programming to interface new CC devices into the process control system.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed customized device templates are generated on-demand by algorithms for integrating real controller controllable devices in a process control system that processes tangible products (e.g., a manufacturing plant or refinery), hereafter generally a "plant" which can create a new device template or modify an existing device template for communications between the process controller and CC devices in the system, according to the device's capability and optionally according to the plant's application. Disclosed embodiments also allow an individual user (e.g., project engineer, customer support engineer or customer) in the plant to customize the device templates. The user can customize the device template depending upon the need and process control system application. As described below, customization can be performed while creating the device template or after device template has been created by modifying an existing device template.

Figure 1:
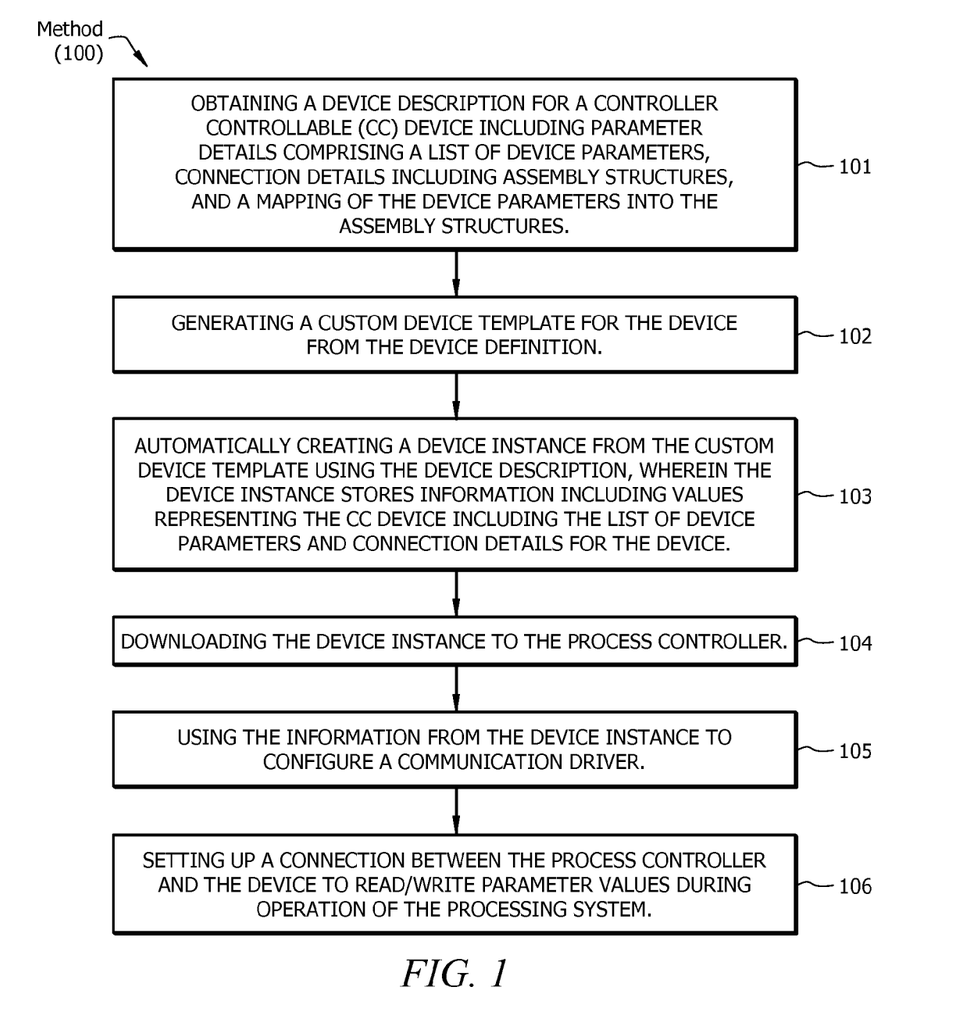
FIG. 1 is a flow chart that shows steps in a method of generating on-demand custom device templates and using information in the device templates for system communications between a process controller and a CC device in a processing plant, according to an example embodiment.

FIG. 1 is a flow chart that shows steps in a method 100 of generating on-demand device templates and using device description information in the device templates for system communications between a process controller and a real CC device (e.g., an industrial drive or programmable electronic relay) in a processing plant, according to an example embodiment. Step 101 comprises obtaining a device description for the CC device including parameter details comprising a list of device parameters, connection details including assembly structures, and a mapping of the device parameters into the assembly structures. The device description provides all the information needed by the process controller to communicate with the CC device and understand the format of input and output data.

Step 102 comprises generating a custom device template using software (via programming using a disclosed algorithm) for the CC device from the device description. The device description information can come from an electronic description file supplied by the device vendor or by manual entry by the user.

Step 103 comprises automatically creating a device instance from the custom device template by instantiating information contained in the device description, wherein the device instance stores values representing the CC device including the list of device parameters and connection details for the CC device. After device instantiation, configuration of the device instance is performed before loading it to the process controller. Configuration information generally includes a device address for the CC device and details regarding how the device should perform. This step is automatic as the user only triggers the creation of device instance and provides a name for the device instance.

Step 104 device comprises downloading the device instance to the process controller. Step 105 comprises using information from the device instance to configure a communication driver. Step 106 comprises setting up a connection between the process controller and the CC device to read and/or write parameter values during processing facility (e.g., plant) operation.

Figure 2A:
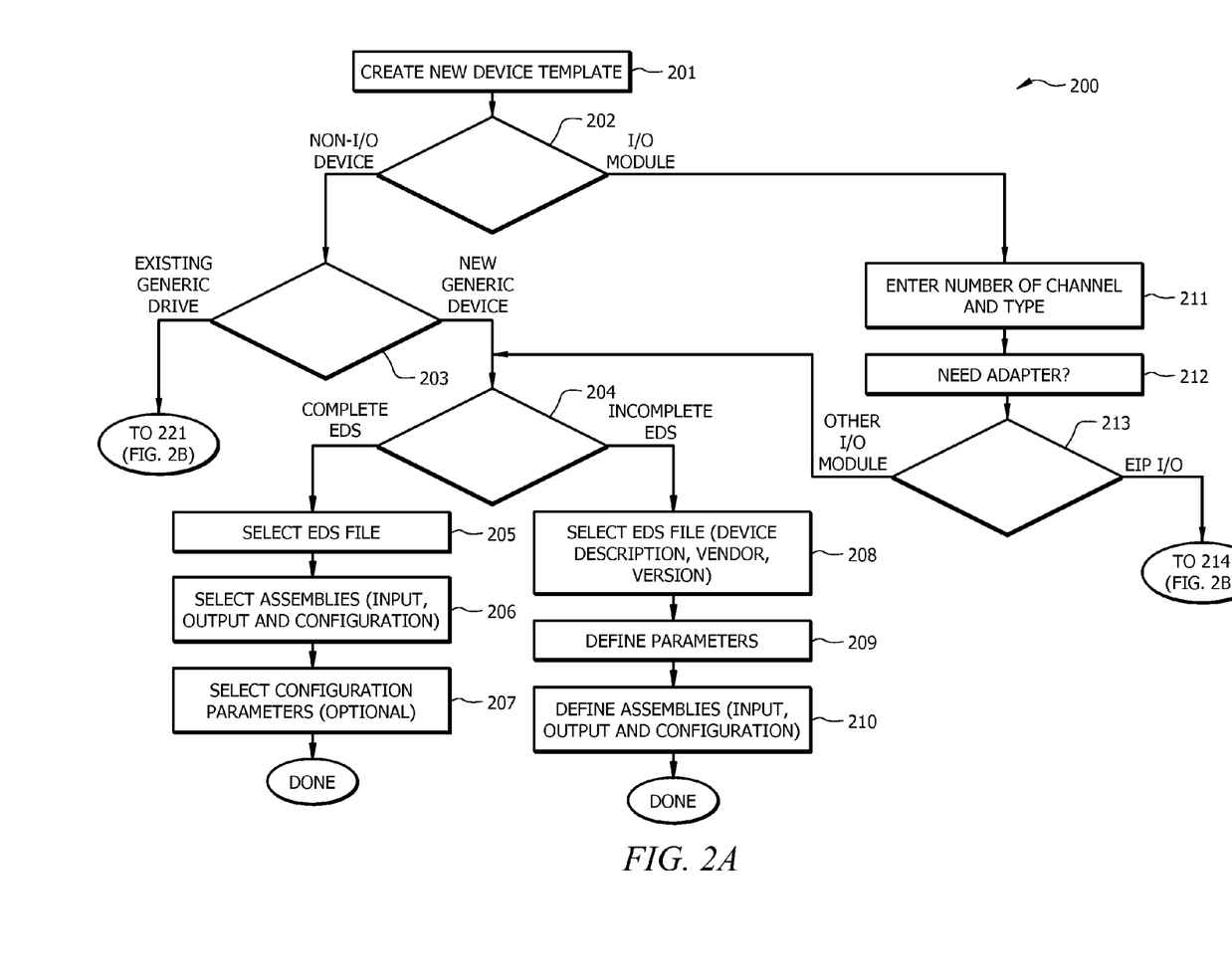
FIGS. 2A-B show an example workflow for creating disclosed device templates, according to an example embodiment.
Figure 2B:
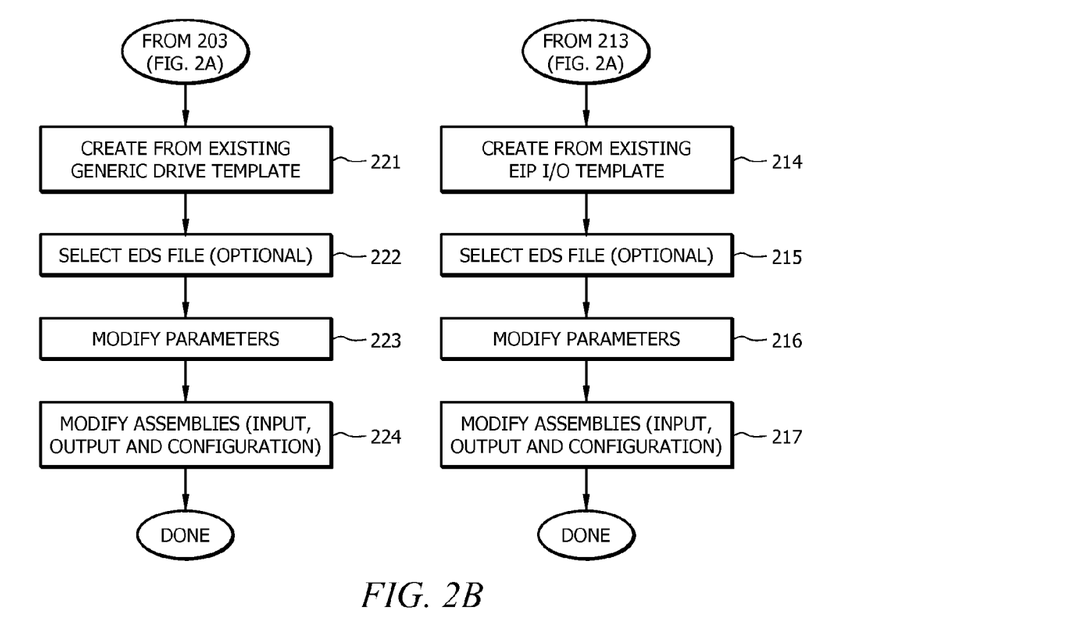
Figure 2C:
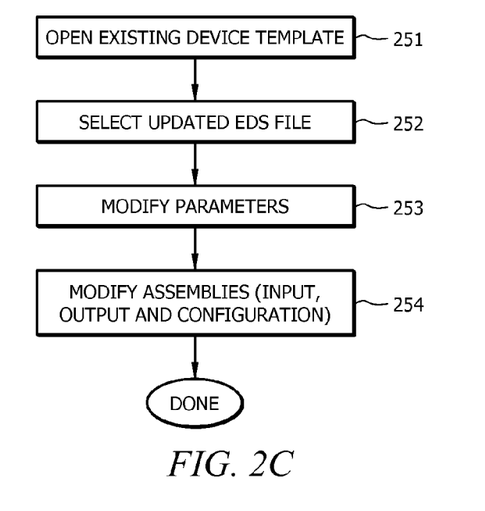
FIG. 2C shows an example workflow for modifying device templates, according to an example embodiment.
Figure 3:
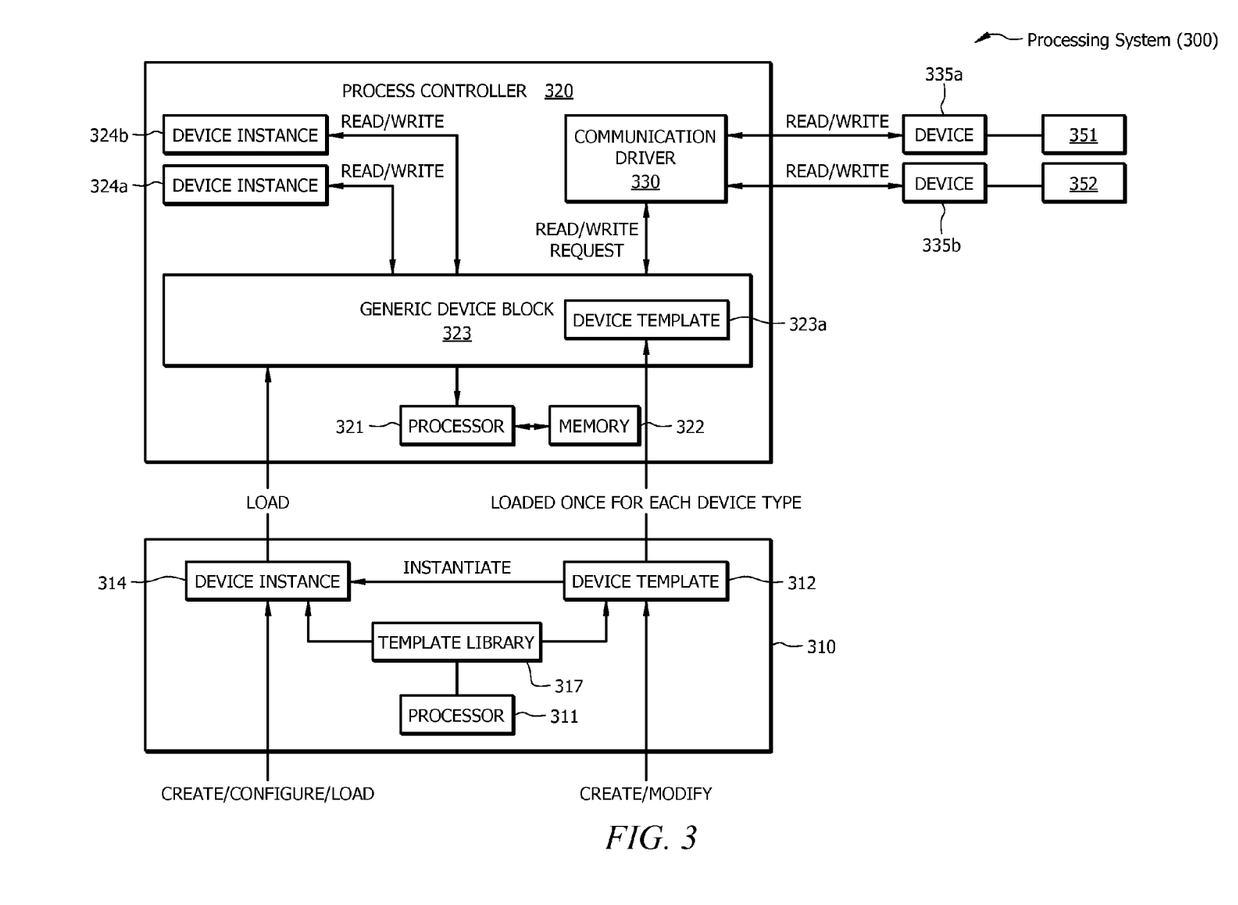
FIG. 3 is a block diagram depiction of a control system controlling operations of a processing plant that includes depictions of the interactions among the different components shown, and the steps performed generating disclosed custom device templates and using the device description information in the device templates during system communications between the process controller and CC devices, according to an example embodiment.

In disclosed embodiments, as noted above, disclosed device templates can be generated by creating anew (see FIGS. 2A and 2B described below) or generated by modifying an existing device template (see FIG. 2C described below), which once generated can be stored in the engineering repository (e.g., a template library in a memory of a disclosed configuration tool (see template library in the memory 317 of the configuration tool 310 shown in FIG. 3). As described above, the device template includes a device description for the CC device including parameter details comprising a list of device parameters, connection details including assembly structures, and a mapping of the device parameters into the assembly structures. A device instance having the device description is then automatically created from the device template (step 103), and the device instance is then downloaded to the process controller (step 104). Downloading to the process controller generally occurs upon the first instance of a given device type loaded into the control system, then the device description provided by the device instance is loaded into the process controller.

If there are any additional parameter(s) to be added for the device template for the CC device, such parameter(s) can be added manually by the user to customize the device template, such as by a project engineer at a data entry terminal coupled to a disclosed configuration tool (e.g., implemented using a personal computer (PC)), where the configuration tool is coupled to the process controller. This enables custom device templates to be generated for any CC device on-demand (i.e. dynamically just-in-time using the device description file or by manual entry from the user) enabling integration of CC devices independent of a particular control system release. Users such as a project engineer, customer support engineer or the customer are now able to generate a new device template or modify an existing device template. This solution provides the ability to integrate CC devices into the control system without requiring any new control system development. The optional ability to add extended parameters to a CC device improves the usability of the solution and addresses customers' scenarios and applications where the extended capabilities of the CC device are intended to be used in the control scheme employed.

FIGS. 2A-B show an example workflow for a method 200 of creating disclosed device templates, according to an example embodiment. In step 201, a new device template is created, where an existing (stored) device template (e.g., derived from a vendor provided DD file) is first saved by the user. Step 202 compromises determining if the CC device is an I/O module or a non-I/O device. If the CC device is a non-I/O device such as an industrial drive or an electronic relay, the method proceeds to step 203 where it is determined whether the CC device is a generic device or an existing generic industrial drive. If the CC device is an existing generic industrial drive, the method proceeds to flow A shown in FIG. 2B including steps 221-224. If the CC device is a new generic device (not an existing generic industrial drive) the flow moves to step 204 where it is determined whether the electronic data sheet (EDS) file provided by the device vendor is complete, or is incomplete.

If the CC device is an I/O module the method proceeds to step 211 where the number of channels and module type is entered by the user. Step 212 considers whether the I/O module needs a communication adapter (an additional piece of hardware). When the communication adapter is included then the process controller connects to the adapter and not to the I/O device for communications (read/write of information). It is then determined in step 213 whether the IO module is an Ethernet/IP (EIP) IO or other IO module. If the IO module is an EIP IO the method proceeds to flow C shown in FIG. 2B including steps 214-217. Step 214 comprises creating another device template from an existing EIP I/O template by reusing content from the existing EIP I/O template. Step 215 comprises optionally selecting the EDS file, step 216 modifying parameters, and step 217 modifying the assemblies (input, output and configuration).

If it is determined in step 213 the IO module is another (not EIP) IO module, the flow moves to step 204 where it is determined whether the EDS file is complete, or is incomplete. If the EDS file is complete, the method proceeds to steps 205-207 where step 205 selects the EDS file, step 206 selects assemblies (input, output and configuration), and step 207 optionally selects configuration parameters. If the EDS is determined to be incomplete, the method proceeds to steps 208-210, where step 208 comprises selecting an EDS file (device description, vendor, version), step 209 defines parameters, and step 210 defines the assemblies (input, output and configuration).

At step 203, if the CC device is an existing generic drive, the method proceeds to flow A shown in FIG. 2B which includes steps 221 to 224. Step 221 comprises creating a device template using the stored definition of an existing generic drive template by reusing the content from existing generic drive template. Step 222 compromises optionally selecting an EDS file, step 223 modifying parameters, and step 224 comprises modifying assemblies (input, output and configuration). Flow A can be useful when minor changes are needed to an existing device template to use it for integrating a new drive into a control system of a plant.

FIG. 2C shows an example workflow for a method of modifying a device template, according to an example embodiment. An existing device template may be changed via a disclosed algorithm when customization is determined to be needed (e.g., to add one or more parameters) or when the device firmware or revision has changed. Step 251 comprises opening an existing device template, step 252 selecting an updated EDS file, step 253 modifying parameters, and step 254 comprises modifying the assemblies (input, output and configuration).

FIG. 3 is a block diagram depiction of a processing system (or processing plant) 300 having a process controller 320 and configuration tool 310 implementing a disclosed customized device template generating algorithm for controlling operations of a process having a plurality of CC devices and a plurality of field devices with field devices 351 and 352 being shown (sensors, actuators, etc.). FIG. 3 includes depictions of the interaction among the different system components shown, and the steps performed generating disclosed device templates and using device description information in the device templates during communications between the process controller 320 and the CC devices 335a, 335b which can be I/O modules. Although shown as a simple processing system 300 having a single process controller 320, disclosed embodiments also apply to distributed control systems (DCSs) where there are a plurality of process controller elements that are distributed throughout the system with each component sub-system controlled by one or more controllers.

Field devices 351 and 352 are shown connected to a process controller 320 through devices 335a and 335b (e.g., I/O modules) which are configured and controlled by the process controller 320. Although not shown, when field devices 351 and 352 are smart field devices, such smart field devices being configurable and controllable by the process controller 320, the smart field devices may be connected directly to the process controller 320. The process controller 320 includes a first processor 321 (e.g., a real-time embedded processor) having associated first non-transitory memory 322, such as static random access memory (SRAM). First processor 321 provides all the data processing described below for process controller 320.

The configuration tool 310 includes a disclosed customized device template generating algorithm that is a software component which is generally stored with device templates in the template library shown stored in a second non-transitory memory 317, such as SRAM. The configuration tool 310 and its data processing performed can be an application running on second processor 311 (e.g., a real-time embedded processor), such as provided by a personal computer (PC). Second processor 311 utilizes memory 317.

The process controller 320 and the computing device (e.g., PC) running the configuration tool 310 are shown communicably connected to one another, such as by a wired or wireless connection. The configuration tool 310 configures device templates 312 and device instances 314 from device templates for loading to the process controller 320 using disclosed software. Disclosed device templates enable communication to the process controller 320 that will control and command the CC devices 335a and 335b such as I/O modules or other CC devices as per the control algorithm and control loops created by the user.

Other disclosed software for supporting disclosed device templates resides in the process controller 320, where there is software for connecting to the CC devices 335a, 335b, configuring as requested by the user and doing read/write/control of the CC devices 335a, 335b. In contrast, the software in the operator station (e.g., in the control room of the processing system 300) is for monitoring the operation on the processing floor and providing an interface that has relevant information and functions needed to operate the process run by the processing system 300.

As noted above, in step 102 a device template is created or an existing stored device template is modified to provide a custom device template. The device template 312 defines a template for a particular CC device type from which device instances 314 are created. The device template 312 has a device description including a list of device parameters (e.g., communication protocol, data format, status and alarms), connection details including assembly structures (about the physical and logical blocks that make up the CC device), and a mapping of the device parameters into the assembly structures. Features and parameters available on a particular CC device depend on the type and manufacturer of the device. As noted above, the configuration tool 310 generally also includes a template library stored in second memory 317 which includes a list of available device templates and device instances.

Using the configuration tool 310 a device template 312 can be defined according to the CC device's capabilities. Device capability refers the features and information that a particular device provides. For example, industrial drives from different manufactures will generally have different features. The device template 312 can be optionally also defined according to the processing plant application.

A processing plant application refers to the usage scenario for a CC device in a given processing facility such as a processing plant. For example, in one example processing plant application the CC device is an adjustable speed drive (industrial drive), a water pump having a variable load that operates 20 hours per day and water requirements for the operation varies during the day with the operation and flow rates as follows:

12 midnight to 8 a.m.: water requirement: 100 percent of maximum flow.

8 a.m. to 6 p.m.: water requirement: 40 percent of maximum flow.

6 p.m. to 12 midnight: water requirement: 60 percent of maximum flow

An adjustable speed drive can be used to control the pump speed of the water pump and hence meet the above time dependent water flow requirements.

As noted above, the list of device parameters and connection details (e.g., communication protocol, data format) for a given CC device can be derived from a DD file associated with the device if it exists, which can be loaded automatically. If there are any additional parameters (features and parameters available on a particular device depends on the type and manufacturer of a device) to be added, they can be added be manual entry by the user. The device template 312 is loaded to the device template 323a of the generic device block 323 of the process controller 320 in step 102 once for each different device type. The generic device block 323 in the process controller 320 represents the generic implementation of the device block.

The configuration tool 310 can also be used to create and configure device instances 314 from the device template 312 (step 103). The device template 312 stores the device description information and device instance 314 stores values representing the CC device.

The device instance 314 is created using the device description defined (and stored) by the device template 312. The device instance 314 stores device specific configuration settings and connection parameters for the CC device. The device template 312 defines a template for a particular CC device type from which device instances are created. The device template 312 is a logical entity that stores the definition of a device type. Device instances 314 are then created from the device template 312 and they represent real physical controller controllable devices.

Generic device block 323 within process controller 320 uses the device description from the device template 312 to create a device instance shown as device instance 324a (for a first device type) and device instance 324b (for a second device type). Generic device block 323 uses the information from the appropriate device instance 324a or 324b to setup a connection with a CC device using the communication driver 330 shown, using device instance 324a for information to configure the communication driver 330 shown when the CC device 335a is a first device type and device instance 324b for the information to configure the communication driver 330 shown when the CC device 335b is the second device type, such as in the case of I/O modules to enable read/write of parameter values to/from I/O modules using the communication driver 330 shown.

The process controller 320 infrastructure shown in FIG. 3 provides the ability to seamlessly integrate CC devices into the processing system 300 without requiring any new development. The ability to add extended parameters to the CC device improves the usability of the solution. This design can be extended to integrate other CC devices that use different communication protocols. Disclosed device templates 312 can encapsulate protocol specific details (e.g., details that make up a device address as per the communication protocol, data format and type of communication) needed to setup communications. The specific communication drivers for the respective protocols can be used to communicate with the CC devices 335a and 335b in the processing system 300 including reading/writing process data.

A plurality of benefits are achieved by modeling of CC devices to provide custom device templates for use in a control system for a processing plant, including:

1. The device template is not tightly coupled with a specific firmware version thereby not restricting customers from moving to the latest device firmware.

2. Device templates based on a standard profile such as CIP profile for Ethernet I/P devices are supported to enable the use of the same category of controller controllable devices from multiple vendors, and also to allow interoperability.

3. Disclosed designs enable the creation and extension of a device template based on the CC device that needs to be created. This allows one to create a template for controller CC devices for which no standard templates are available in the template library where the configuration tool 310 has a list of available device templates.

4. Disclosed designs allow the use of vendor specific features that are not part of the standard device profile.

The following design aspects provide a flexible design which provides the benefits described above:

1. Known static templates in the process controller hardcode the format of input, output and configuration assembly (an "assembly" is block of data being read/write to device) structures and parameters into firmware (hard coded) which makes them specific to the device firmware. Disclosed embodiments in contrast use a generic device template 323a instead in the process controller 320, where the generic device template 323a does not include any hard-coded device specific parameters or structures. Generic device template 323a implementation available in the process controller's 320 firmware is responsible for connection, state management and read/write of parameters values. It need not contain any device specific feature or parameters. The device templates 312 created in the configuration tool 310 have specific features and parameters of a CC device that is an extension to (and thus customizes) the generic definition available in the generic device template 323a of the process controller 320.

2. The device template 312 is loaded when first instance of the CC device is loaded to the process controller 320. For example, the device template 312 for an industrial drive will provide information to the generic device template 323a in the process controller 320 that it operates using parameters such as speed, speed reference, drive direction, drive mode, status, and how to read/write their values.

3. The device template 312 in disclosed configuration tools contains parameters, connection details for communication, the structure of device assemblies, and a map that helps locate parameter values in the device assemblies for the CC device. As disclosed above, this information can be automatically loaded to the process controller 320 when the first instance of the device 335a or 335b is loaded.

4. The process controller 320 has a generic implementation of a CC device that will be responsible for connection, state management and read/write of parameters values. While reading it will utilize the assembly mapping to extract parameter values received in the input assembly packet. While writing it will utilize the assembly mapping to store the parameter values in the appropriate locations in the output assembly packet.

5. Together, the device template 312 in the configuration tool 310 and the generic device template 323a implementation in the process controller 320 provide an infrastructure to support creation and use of custom parameters to represent attributes in a given CC device. Once a custom parameter has been defined, its mapping into an assembly can be defined. Information about custom parameters and their mapping into an assembly for a CC device can be loaded to the process controller 320 when the first instance of the device is loaded.

6. The generic device template 323a implementation in the process controller 320 will generally have standard parameters for connection management, status and others mandated by control system. As described above, custom device parameters are provided to the process controller 320 by the device instance 314 on load and stored in device instances 324a and 324b in the process controller 320.

The following are disclosed features believed to be novel. The ability to integrate a variety of different CC devices from different vendors without requiring any new development. Enhanced usability as parameters can be created on the device template for a parameter or attribute on the CC device. Parameters on the device template can have user-friendly names and data types that would not only improve usability but also ensure strict type checking to minimize engineering errors. Enhanced usability as the customer will be able to utilize the extended capabilities of the CC device depending on the industrial application.

Firmware upgrade of a CC device can be supported even if it requires a change in the device template. This is enabled by allowing the modification of the corresponding device template. Replacement of an old CC device with a new version of the CC device can be supported by modifying the corresponding device template. Increased capacity is provided in cases wherein device templates are configured to have only the required set of parameters needed for a given industrial application. There is no need to create a single template with a large parameter set that takes into account a broad range of industrial applications. Disclosed embodiments enable the definition of status information as part of the device template.

This definition includes status information published by the device and how it should be interpreted by the system. An example would be the values that represent normal state or failure or alarm for the status of the CC device. Disclosed embodiments enable the definition of custom device alarms using the status and diagnostic information published by the CC device. Status and diagnostic information would be available as parameters on the device template. Custom device alarms can also have associated conditions defining when the alarm should be raised. The method described herein to integrate controller controllable devices in control systems is independent of the communication protocol used.

EXAMPLE

Disclosed embodiments are further illustrated by the following specific Example, which should not be construed as limiting the scope or content of this Disclosure in any way.

This Example describes creation and user activities with a CC device being an industrial drive that controls the speed of another device, such as the pumping speed of a water pump. As described above, the user initiates the creation of a device type template generally using a computing device having a processor, such as a PC running a disclosed configuration tool algorithm as an application. The user provides a name of the device template. Then the user either provides an available DD file that has following information in a and b shown below, or enters the equivalent information manually:

a. Input, output, and configuration parameters supported by the industrial drive. Typical examples of parameters for an industrial drive would be speed reference, speed actual, drive status, drive command and drive mode.

b. Input, output and configuration assembly structure supported by the industrial drive. Typical examples would be of assemblies supported for industrial drive would be input/output and configuration assemblies for controlling speed. An industrial drive may support different set of assemblies for different purpose. Example: Input/output and configuration assemblies for controlling speed, input/output and configuration assemblies for controlling speed and torque.

A disclosed configuration tool uses the above information in a, b and automatically creates a device template. Using the device template as a blueprint, the user can create one or more device instances for the CC device from the device template. Each device instance represents an actual physical instance of a CC device in the plant and includes stored values representing the real physical device. After creation, the device instance is then configured by setting parameters as per needs and control algorithms that are created using the device instance. Once the configuration is completed the device instance along with control algorithms are loaded to the process controller. The process controller then connects to the CC device, configures the CC device using the parameter information loaded as part of device instance load. The process controller also does read/write/control of the CC device as per the control algorithm loaded for the device.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of generating device templates for integrating a controller controllable (CC) device with a process controller in a processing plant, comprising:

obtaining an existing device template having a device description for said CC device including a list of its device parameters, its type of said CC device, its communication protocol, and its data format being either serial data or parallel data, connection details for communications including assembly structures being a block of data for reading parameter values received from said CC device and writing parameter values to said CC device, and a mapping of said device parameters into said assembly structures or said device description, and using a processor implementing a device template generating algorithm, generating a custom device template for said CC device (i) by modifying said existing device template to include at least one modification or (ii) generating said custom device template anew from said device description, wherein said custom device template provides all information needed by said process controller to communicate with said CC device and understand said data format.

2. The method of claim 1, wherein said device description is provided from a device description file for said CC device, and said generating said custom device template is automatic.

3. The method of claim 1, wherein said custom device template is created manually from said device description.

4. The method of claim 1, further comprising adding at least one additional parameter to said custom device template.

5. The method of claim 4, wherein said additional parameter is specific to a plant application at said processing plant.

6. The method of claim 1, wherein said custom device template includes status definition information for said CC device.

7. The method of claim 1, further comprising:
automatically creating a device instance from said custom device template using said device description, wherein said device instance stores values representing said CC device including said list of device parameters and said connection details for said CC device,
said process controller using information from said device instance to configure a communication driver;
setting up a connection between said process controller and said CC device, and
reading and/or writing values of said device parameters between said process controller and said CC device.

8. The method of claim 1, wherein said CC device is an input/output (I/O) module, an industrial drive, an electronic relay, or a smart field device.

9. The method of claim 1, wherein said process controller has a generic device template that excludes hard-coded device specific parameters or structures, further comprising loading said custom device template to said process controller upon a first instance of said CC device.

10. The method of claim 9, wherein said custom device template provides specific features and parameters of said CC device that customizes a generic definition of said CC device in said generic device template.

11. A process controller combination, comprising:
a process controller including a first processor and first memory;
a configuration tool coupled to said process controller comprising a second processor implementing a device template generating algorithm stored in a second memory, said device template generating algorithm implementing:
generating a custom device template for a controller controllable (CC) device (i) by modifying an existing device template having a device description for said CC device including a list of its device parameters, its type of said CC device, its communication protocol, and its data format being either serial data or parallel data, connection details for communications including assembly structures being a block of data for reading parameter values received from said CC device and writing parameter values to said CC device, and a mapping of said device parameters into said assembly structures to include at least one modification or (ii) generating said custom device template anew from said device description;
wherein said custom device template provides all information needed by said process controller to communicate with said CC device and understand said data format;
automatically creating a device instance from said custom device template, wherein said device instance stores values representing said CC device including said list of device parameters and said connection details for said CC device, and
downloading said device instance to the process controller;
wherein said process controller is programmed to use information from said device instance to configure a communication driver, and set up a connection between said process controller and said CC device for enabling reading and/or writing values of said device parameters between said process controller and said CC device.

12. The process controller combination of claim 11, wherein said process controller includes a generic device template that excludes hard-coded device specific parameters or structures, and wherein said custom device template generated in said configuration tool provides specific features and parameters of said CC device that customizes a generic definition of said CC device in said generic device template.

13. The process controller combination of claim 11, wherein said CC device is an input/output (I/O) module, an industrial drive, an electronic relay, or a smart field device.

14. The process controller combination of claim 11, wherein said custom device template includes status definition information for said CC device.

* * * * *